Patented Dec. 29, 1925.

1,567,200

UNITED STATES PATENT OFFICE.

HERMANN STAUDINGER, OF ZURICH, SWITZERLAND, ASSIGNOR TO SOCIETY OF CHEMICAL INDUSTRY IN BASLE, OF BASEL, SWITZERLAND.

MANUFACTURE OF DERIVATIVES OF 4-HYDROXYPIPERIDINES AND PROCESS OF MAKING SAME.

No Drawing.   Application filed March 28, 1925.   Serial No. 19,154.

*To all whom it may concern:*

Be it known that I, HERMANN STAUDINGER, a citizen of the Swiss Confederation, and residing at Zurich, Switzerland, have invented new and useful Improvements in the Manufacture of Derivatives of 4-Hydroxypiperidines and Processes of Making Same, of which the following is a full, clear, and exact specification.

The present invention relates to derivatives of 4-hydroxypiperidines of the formula

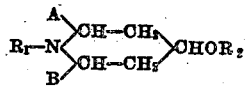

wherein A, B=alkyl and $R_1$=H, alkyl, aryl, aralkyl, and $R_2$=H or acidyl. It comprises the process of manufacture thereof and the new products of the formula

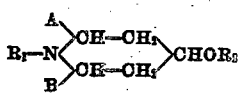

wherein A and B=alkyl, $R_1$=H, alkyl, aryl, aralkyl, $R_2$=H or acidyl, and in which formula $R_1$ and $R_2$ cannot at the same time be H and the sum of carbon atoms in $R_1$ and $R_2$ is more than 1.

The 2.6-dimethyl-N-methyl-4-hydroxypiperidine differs from tropine only in that it lacks the pyrrolidine ring (see German specification No. 292,871).

It may therefore be regarded as an open chain tropine:

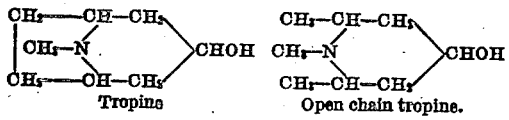

Tropine.   Open chain tropine.

Compounds of this or a similar kind have already been described in literature. They are obtained by reducing the corresponding pyridine derivatives. The esterification of these open chain tropines produces substances which are medicaments.

According to this invention, such open chain tropine derivatives are produced in quite a new manner by converting a diallylcarbinol ester or a substitution product thereof into its dihydrohalide and treating the latter with ammonia or an aliphatic, aromatic or aliphatic-aromatic primary amine.

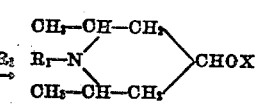

R=acidyl residue; $R_1$=H or alkyl, aryl, arylalkyl; X=H or R.

The diallylcarbinol esters which serve as parent materials can be obtained by the process of Saytzeff, Liebigs Annalen 185 (1877), page 129. By treating these with hydrogen halide, the dihydrohalide addition products are obtained. Stereoisomerides are produced and can be separated by crystallization. By the action of ammonia or a primary amine on the dihydrohalide of the diallylcarbinol ester, if necessary in presence of an indifferent solvent, the piperidine ring closure occurs. The reaction is advantageously accelerated by gentle heating.

The hydrohalides of the esters of the corresponding open chain tropines separate after the condensation in either solid or liquid condition and are preferably subjected to a purification by re-precipitation or crystallization.

According to the kind of diallylcarbinol ester used for the condensation, the open chain tropine ester obtained is more or less stable. For instance, starting from diallylcarbinolacetate there is obtained the corresponding open chain tropine acetate which even at the temperature necessary for ring closure is in part saponified to free open chain tropine. For the purpose of completing the saponification the mixture produced by the reaction may be heated with a dilute solution of caustic potash. The aromatic acid esters of the open chain tropines are much more stable. By selecting the diallylcarbinol ester, therefore, it is possible to obtain in a single reaction either the open chain tropine ester, or, in preponderance, the free tropine. In any case the ester may be converted into the free tropine by saponification with alkali.

The following examples illustrate the invention:—

Example 1.

Adopting a process which is a variation of Saytzeff's, 760 grams of allylbromide, 220 grams of formic acid ethyl ester are caused to react with 400 grams of zinc filings in presence of 800 cc. of absolute ether. Then one gram molecule of benzoic acid anhydride is caused to react on the mixture so that the benzoate of diallylcarbinol is obtained; this is purified by distillation in a vacuum, and is then converted into its dihydrobromide by treatment with two gram molecules of hydrogen bromide in solution of 30 per cent strength in glacial acetic acid. Three stereoisomerides of this dihydrobromide are possible; one of them melts at 76–78° C. and can easily be isolated by treatment with petroleum ether.

These dihydrobromides, either in crude unseparated condition or after separation when in a pure state, are caused to react with two gram molecules of a primary base in the presence of twice the volume of benzene or toluene, with exclusion of water and at 80–100° C. After about ½ to 1 day reaction is complete, and if pure parent materials have been used the hydrobromide of the benzoate separates as a crystalline mass together with the hydrobromide of the primary base. On the other hand, if the mixture of the stereoisomerides is used, the separated mass of salts generally does not crystallize.

For example, if methylamine is used in the reaction, the hydrochloride of the benzoate of 2.6-dimethyl-N-methyl-4-hydroxypiperidine is obtained as a white crystalline powder, which melts at 201–203° C. The free benzoate is liquid and boils at 170°—173° C. at 13 mm. pressure.

The phenylethyl derivative is obtained by the action of phenylethylamine with the hydrobromide of diallylcarbinol benzoate in form of its hydrobromide, which constitutes a white crystalline powder, sparingly soluble in water and melting at 225° C. The hydrochloride is also a white crystalline powder melting at 191–193° C.

The hydrohalides of the benzoates are generally less soluble in water than the corresponding salts of the primary base used for the reaction, and may thus be separated from the latter by treatment with cold water. Usually it is not necessary to isolate the free esters, since the aqueous solutions of the hydrohalides of the esters are used.

If the separated salts do not crystallize the components of the mixture cannot be separated by fractional distillation; in this case, the primary base may be separated by liberating it together with the tropine ester by addition of caustic soda lye and separating the more volatile primary base from the tropine ester by distillation in a vacuum.

Example 2.

3 molecular proportions of anhydrous methylamine are heated in about 2 parts of benzene or toluene with 1 molecular proportion of the dihydrobromide of diallylcarbinolacetate for 3 hours at 80–90° C. Reaction occurs with piperidine ring closure.

The mass of salts which separates is a mixture of the hydrobromides of the N-methyl-2.6-dimethyl-4-hydroxypiperidine and its acetate. From this mixture the free base may be isolated by saponification with caustic potash solution of 10 per cent strength, extraction with ether and distillation in a vacuum. The pure substance melts at 89.5–90.5° C. By treatment with sodium amylate a stereoisomeride can be obtained as in the case of tropine; this is liquid and boils at 106–108° C. at 12 mm. pressure.

In similar manner there may be obtained, by using, instead of methylamine, alcoholic ammonia, the 2.6-dimethyl-4-hydroxypiperidine (open chain Nortroperin), melting at 132–133° C., with allylamine the N-allyl-derivative, melting at 48–49° C., and with phenylethylamine the N-phenylethyl-derivative melting at 85–87° C.

Instead of the benzoates and acetates of diallylcarbinol other esters, f.i. the mandelic ester, and instead of the amines named above other primary amines, f.i. ethylamine or its homologues, further aniline, benzylamine and other aliphatic, aromatic, or aliphatic-aromatic amines may be used.

What I claim is:

1. Process for the manufacture of derivatives of 4-hydroxypiperidines by converting a diallylcarbinolester into its dihydrohalide and condensing the latter with a base of the formula $NH_2R$ wherein R=H, alkyl, aralkyl or aryl.

2. Process for the manufacture of derivatives of 4-hydroxypiperidines by converting a diallylcarbinolester into its dihydrohalide and condensing the latter with a base of the formula $NH_2R$ wherein R=H, alkyl, aralkyl or aryl, the condensation being conducted in presence of an indifferent solvent.

3. Process for the manufacture of derivatives of 4-hydroxypiperidines by converting a diallylcarbinolester into its dihydrohalide and condensing the latter with a base of the formula $NH_2R$ wherein R=H, alkyl, aralkyl or aryl, the condensation being conducted with gentle heating.

4. Process for the manufacture of derivatives of 4-hydroxypiperidines by converting a diallylcarbinolester into its dihydrohalide and condensing the latter with a base of the formula $NH_2R$ wherein $R=H$, alkyl, aralkyl or aryl, the condensation being conducted in presence of an indifferent solvent and with gentle heating.

5. Process for the manufacture of derivatives of 4-hydroxypiperidines by converting a diallylcarbinolester into its dihydrohalide condensing the latter with a base of the formula $NH_2R$ wherein $R=H$, alkyl, aralkyl or aryl, and saponifying the product thus obtained.

6. Process for the manufacture of derivatives of 4-hydroxypiperidines by converting a diallylcarbinolester into its dihydrohalide and condensing the latter with phenylethylamine in presence of an indifferent solvent and with gentle heating.

7. Process for the manufacture of derivatives of 4-hydroxypiperidines by converting diallylcarbinolbenzoate into its dihydrohalide and condensing the latter with phenylethylamine in presence of an indifferent solvent and with gentle heating.

8. As new products the herein described derivatives of 4-hydroxypiperdines of the general formula:

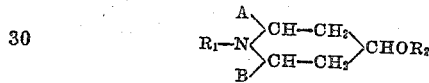

wherein A and $B=$alkyl, $R_1=H$, alkyl, aryl or aralkyl, $R_2=H$ or acidyl, in which formula $R_1$ and $R_2$ cannot at the same time mean H, and in which the sum of carbon atoms in $R_1$ and $R_2$ is greater than 1.

9. As new products the herein described esters of 4-hydrooxypiperidines of the general formula:

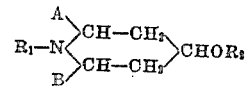

wherein A and $B=$alkyl, $R_1=H$, alkyl, aryl or aralkyl, $R_2=$acidyl.

10. As new products the herein described esters of 4-hydroxypiperidines of the general formula:

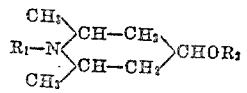

$R_1=H$, alkyl, aryl or aralkyl, $R_2=$an aromatic acidyl group.

11. As new products the herein described esters of 4-hydroxypiperidines of the general formula:

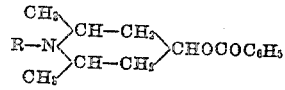

$R=H$, alkyl, aryl or aralkyl.

12. As new product the herein described benzoate of 2.6-dimethyl-N-phenylethyl-4-hydroxypiperidine of the formula

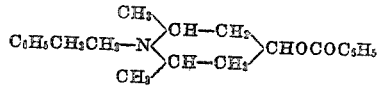

which forms with hydrohalides crystalline salts, sparingly soluble in water, the hydrobromide melting at 225°, the hydrochloride at 191–193°.

In witness whereof I have hereunto signed my name this 14th day of March, 1925.

HERMANN STAUDINGER.